Patented May 1, 1951

2,550,747

UNITED STATES PATENT OFFICE 2,550,747

THERMOSETTING COMPOSITIONS COMPRISING AN AMINOPLAST AND ALKYL CYCLIC AMIDINES INCORPORATED THEREIN

Henry P. Wohnsiedler, Darien, and John F. Blais, South Norwalk, Conn., assignors to American Cyanamid Company, New York, N. Y., a corporation of Maine No Drawing. Application June 2, 1947, Serial No. 751,959

16 Claims. (Cl. 260—67.6)

This invention relates to thermosetting aminoplastics, and, more specifically, it is directed to thermosetting molding and laminating compositions containing a thermosetting aminoplast having alkyl cyclic amidines, particularly alkyl guanides and guanamines incorporated therein.

Molding and laminating compositions of the thermosetting aminoplast type, such as urea-formaldehyde resins and the aminotriazine formaldehyde resins, particularly the clear, unfilled melamine-formaldehyde resins, frequently stick to the mold when molded. Lubricants have therefore been used to provide compositions which do not stick or foul when molded. Previously used lubricants, however, detract from the clarity of the molded particle.

It has now been found that alkyl cyclic amidines such as lauroguanide, lauroguanamine, etc., when admixed with the thermosetting aminoplasts, produce molding compositions which do not stick to the mold or otherwise foul the mold in producing molded articles therefrom. A minimum of 0.2% amidine based on the weight of resin should be used for satisfactory lubrication, and no particular advantage is obtained by using more than 2.0%; in fact, it is frequently inadvisable to employ over 2.0% amidine. It has further been found that a thermosetting melamine-formaldehyde molding composition having incorporated therein from about 0.2–0.5 percentage, based on the resin weight of these alkyl cyclic amidines, in which the alkyl radical is derived from the higher fatty acids having a carbon atom chain from about 8–18 is preferred; the molded articles obtained therefrom are transparent. The optimum length of the alkyl radical is 10 to 14 carbon atoms for clarity of product, ease of handling, and lubrication of aminoplasts, filled and unfilled, pigmented or clear, and with or without a curing agent.

In order to illustrate more fully the cyclic amidines employed in this invention, the following examples describing methods of preparing some of them are given wholly by way of illustration.

*Caproguanide*

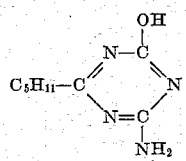

One hundred seventy-two (172) parts by weight of caproyl-dicyandiamide, 105 parts by weight of concentrated HCl and 250 parts by weight of water was heated under refluxing condenser until the materials had completely dissolved, and then for 10 minutes longer. Upon cooling, a thick cake of caproyl-guanylurea hydrochloride crystals was obtained. This material was treated with a solution of 105 parts by weight of NaOH in 300 parts of water. The resulting clear solution was heated to near boiling, and then cooled in an ice bath. Upon acidification with acetic acid, a colorless solid precipitated which was filtered, washed with water and allowed to dry. The product, caproguanide, was obtained in an 88% yield. The crude product was dissolved in 50% alcohol, and recrystallized to give colorless flakes which decomposed when heated at 240–241° C. Chemical analysis checked closley with the theoretical values for caproguanide.

*Lauroguanide*

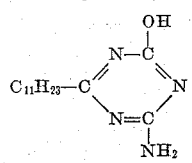

To a solution of 16 parts by weight of 95% NaOH, in 500 parts by weight of water, was added 100 parts by weight of lauroyl-guanylurea. After heating the mixture to boiling, a clear solution resulted. Heating was then continued for several minutes at refluxing temperature, and the solution cooled and acidified with acetic acid. The colorless solid was cooled, filtered, washed with water, and allowed to dry at 70° C. Recrystallization of the material from the ethyl ether of ethylene glycol gave plates of lauroguanide which decomposed when heated to 229° C.–230° C.

*Myristoguanide*

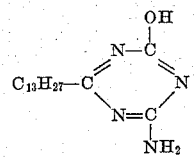

Ten (10) parts of crude myristoyl carbamyl guanidine sulfate was heated in 100 parts of a 30% aqueous ethanol solution, and 3 parts of sodium hydroxide in 50 parts of 30% aqueous alcohol was added. Heating was continued until a clear solution resulted. The solution was distilled with 150 parts of water, cooled and acidified with 50% acetic acid. The guanide obtained in this manner, was filtered, washed with acetone, and dried. It was recrystallized from methyl ether of ethylene glycol to yield almost colorless plates having a melting point of 219° C.–221° C.

Generally, the alkyl cyclic amidines suitable for this invention may be designated by the formula:

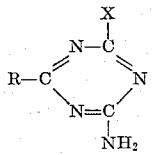

wherein R represents an alkyl radical having 7 to 17 carbon atoms in the chain, and X represents an hydroxyl or amino radical.

These amidines may also be classified as 1, 3, 5 triazines, wherein they are 4-amino, 6-alkyl, and 2-hydroxyl or amino. As examples of others of these compounds, there may be mentioned: caproguanamine, lauroguanamine, myristoguanamine, stearoguanamine, stearoguanide, etc.

The foregoing examples are merely illustrative of some of the compounds useful in this invention. Other suitable compounds of this type may be prepared by mere substitution of the reactants; and, compounds of this type, suitable for use according to the teachings of this invention, may be prepared by other well known methods.

The following examples illustrate procedures for preparing resins suitable for employment in this invention. It is to be understood that these examples are merely descriptive, and not limitations, as the invention is adapted to all thermosetting aminoplast molding resins.

*Example 1*

Three hundred ten (310) parts of melamine, and 600 parts of a 37% formaldehyde solution were adjusted with sodium hydroxide, and the mixture heated to approximately 75° C., at which point the pH was 7.5. As this temperature is approached, tests are made for hydrophobicity, and when several drops of the solution added to water at 5° C. produce cloudiness, the desired polymerization for hydrophobicity is obtained. This product is suitable as a starting material. To further polymerize the product, the pH is adjusted to 9.5 (glass electrode) with sodium hydroxide, and the syrup concentrated under vacuum with a rising temperature to 115° C. The reaction product was removed from the vessel in a fluid condition, forcibly cooled, and tray dried at reduced pressure.

*Example 2*

A molding resin was prepared by mixing 512 parts 37% formaldehyde solution, 386 parts of melamine at a temperature of 80° F., and adjusted with sodium hydroxide to a pH of approximately 7.0. The slurry was heated to reflux, 30 to 40 minutes being required to raise the temperature to this point; the pH was then checked and adjusted to between 8.0 and 9.0. At this point, the material was slowly cooled to approximately 176° F., and held at that temperature while viscosity tests were made. When the reaction syrup reached a viscosity at 25° C. of 45–50 seconds (Stormer), the syrup was adjusted in pH to approximately 9.5 and spray dried. The spray drying conditions are such as to produce a product which has a viscosity of 21–28 centipoises at 20° C., a pH at 25° C. of 8.5–9.5, and hydrophobicity at 15–25% dilution.

The following examples describe some molding compositions of this invention, and the utility thereof.

*Example 3*

A spray dried melamine-formaldehyde resin powder (1:2 molar ratio) was heat-treated to give a molding composition of sufficiently stiff flow to be molded directly without preheating, 2–3 hours at 110° C. being sufficient. This resin and an amount of caproguanide equivalent to 0.2% of the weight of the resin, were charged to a ball mill and milled for approximately three hours. In this way, the lubricant was distributed over the particles of the molding compound, and acted as a film barrier between the plastic and metal mold. Molded articles were made from this composition by molding at 155° C., and 4000 p. s. i. for 5 minutes, after which the molded articles were easily removable from the mold without sticking, and had excellent appearance and clarity.

*Example 4*

A spray dried melamine-formaldehyde resin powder (1:2 molar ratio) was heat-treated to give a molding composition of sufficiently stiff flow to be molded directly without preheating, 2–3 hours at 110° C. being sufficient. This resin and an amount of myristoguanide, equivalent to 0.2% of the weight of the resin, were charged to a ball mill and milled for approximately three hours. Molded articles were made from this composition by molding at 155° C., and 4000 p. s. i. for 5 minutes, after which the molded articles were easily removable from the mold without sticking, and had excellent appearance and clarity.

*Example 5*

A spray dried melamine-formaldehyde resin powder (1:2 molar ratio) was heat-treated to give a molding composition of sufficiently stiff flow to be molded directly without preheating, 2–3 hours at 110° C. being sufficient. This resin and an amount of caproguanide, equivalent to 0.5% of the weight of the resin, were charged to a ball mill and milled for approximately three hours. The molded articles were made from this composition by molding at 155° C. and 4000 p. s. i. for 5 to 10 minutes; in this case the molded articles were not as easily removed from the mold as in the preceding examples. They had good appearance and clarity, however.

*Example 6*

A tray dried melamine-formaldehyde resin powder (1:2 molar ratio) was heat-treated to give a molding composition of sufficiently stiff flow to be molded directly without preheating, 2–3 hours at 110° C. being sufficient. This resin and an amount of lauroguanide, equivalent to 0.5% of the weight of the resin, were charged to heated differential rolls with 15% diglycol sebacate based on the weight of resin. With the fast roll at 140° C. and the slow roll at 110° C., the charge was milled for 50 minutes and then withdrawn as a sheet. This was broken up and ground to form the lubricated molding compound. In this way, the lubricant was distributed over the resin particles, and acted as a film barrier between the plastic and steel rolls to prevent sticking thereto. The resin was moreover plasticized for easier workability. Molded articles were made from this composition by molding at 155° C. and 4000 p. s. i. for 10 minutes. The molded articles were easily removable from the mold without sticking, and had excellent appearance.

*Example 7*

A tray dried melamine-formaldehyde resin powder was heat-treated to give a molding composition of sufficiently stiff flow to be molded directly without preheating, 2-3 hours at 110° C. being sufficient. This resin and an amount of stearoguanide, equivalent to 0.5% of the weight of the resin, were charged to a ball mill with 15% mono ortho-cresyl-glyceryl ether based on the weight of resin, and milled for approximately three hours. Molded articles were made from this lubricated and plasticized composition by molding at 155° C. and 4000 p. s. i. for 10 minutes. The molded articles were easily removable from the mold without sticking, and had excellent appearance and clarity.

*Example 8*

A spray dried melamine-formaldehyde resin powder was heat-treated to give a molding composition of sufficiently stiff flow to be molded directly without preheating, 2-3 hours at 110° C. being sufficient. This resin and an amount of stearoguanide, equivalent to 0.2% of the weight of the resin, were charged to a ball mill and milled for approximately three hours. Molded articles were made from this composition by molding at 155° C. and 4000 p. s. i. for 5 minutes. The molded articles were easily removable from the mold without sticking.

Lubricants of the described type are particularly suitable when used in unfilled resins such as the clear melamine-formaldehyde resins. Here they do not detract from the normal molded appearance of these resins, and serve the purpose of lubricating metal surfaces with which the resin or final plastic may come in contact. They may also be used in aminoplastic molding compounds containing fibrous fillers, instead of the metal soap lubricants which are generally used in these compositions. In such case, they serve to improve the light trasmission of the molded plastic.

Any of the thermosetting aminoplast molding resins may be employed in practicing this invention. For example, the aminotriazine-aldehyde resins, such as melamine-formaldehyde resins, acetoguanamine-formaldehyde, formoguanamine-formaldehyde resins, etc., may be satisfactorily employed. It is advisable, however, to employ a resin of this type having a mol ratio of from about 1 to about 4 mols of aldehyde per mol of triazine, since the higher ratio resins are not particularly suited or adapted for the molding techniques of this invention. Urea molding resins, such as the urea-formaldehyde resins, are particularly useful in practicing this invention.

The aminoplast molding resins may be used with or without additives, such as inert filler, colorants, curing agents, and the like. Likesewise, these molding resins may be partially alkylated, if desired, or modified with other resins. Depending upon the particular utility and working conditions desired, it is frequently desirable to plasticize these amino plast molding resins, and plasticizers, such as diglycol adipate, glycerol sebacate, and the like, are suitable. These additives, i. e., fillers, colorants, curing agents, plasticizers, etc., may be added during the resin formation or when blending with the lubricants to form molding compositions of this invention.

We claim:

1. A thermosetting composition comprising a dry, fusible melamine-formaldehyde molding resin, and 0.2% to 0.5% of an akyl guanide based on the weight of resin, and wherein said alkyl radical contains 10-14 carbon atoms.

2. A thermosetting composition comprising a thermosetting melamine-formaldehyde molding resin and 0.2% to 0.5% of an alkyl guanide based on the weight of resin, wherein said alkyl radical contains 7 to 17 carbon atoms.

3. A thermosetting composition comprising a fusible melamine-formaldehyde molding resin and 0.2% to 0.5% of stearoguanide based on the weight of resin.

4. A thermosetting composition comprising a melamine-formaldehyde molding resin and 0.2% to 0.5% lauroguanide based on the weight of resin.

5. A thermosetting composition comprising a melamine-formaldehyde molding resin and 0.2% to 0.5% myristoguanide based on the weight of resin.

6. A molded article comprising the heat and pressure molded composition, a plasticized melamine-formaldehyde molding resin, and 0.2% to 0.5% of myristoguanide based on the weight of resin.

7. A molded article comprising the heat and pressure molded composition of a plasticized melamine-formaldehyde molding resin, and 0.2% to 0.5% of an alkyl guanamine based on the weight of resin having 7 to 17 carbon atoms in the alkyl radical.

8. A molding composition comprising a thermosetting aminoplast selected from the group consisting of urea-formaldehyde resin and melamine-formaldehyde resin, and 0.2% to 0.5% of an alkyl cyclic amidine based on the weight of said aminoplast, said amidine having the general formula:

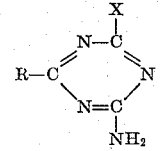

wherein R represents an alkyl radical having 7 to 17 carbon atoms in the chain, and X represents a member selected from the group consisting of hydroxyl and amino radicals.

9. A molding composition comprising a thermosetting aminoplast selected from the group consisting of urea-formaldehyde resin and melamine-formaldehyde resin, and from 0.2% to 0.5% of 2-hydroxy-4-amino - 6 - alkyl - 1,3,5-triazine based on the weight of said aminoplast, and wherein said alkyl radical has from 7 to 17 carbon atoms.

10. A thermosetting composition comprising an urea-formaldehyde molding resin, and 0.2% to 0.5% of an alkyl cyclic amidine based on the weight of said resin, said amidine having the general formula:

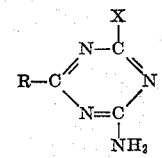

wherein R represents an alkyl radical having 7 to 17 carbon atoms in the chain, and X represents a member selected from the group consisting of hydroxyl and amino radicals.

11. A thermosetting composition comprising a melamine-formaldehyde molding resin and 0.2% to 0.5% of an alkyl cyclic amidine based on the weight of said resin, said amidine having the general formula:

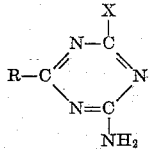

wherein R represents an alkyl radical having 7 to 17 carbon atoms in the chain, and X represents a member selected from the group consisting of hydroxyl and amino radicals.

12. A thermosetting composition comprising a thermosetting molding aminoplast selected from the group consisting of urea-formaldehyde resin and melamine-formaldehyde resin and 0.2% to 0.5% of an alkyl cyclic amidine incorporated therein, based on the weight of said aminoplast, said composition being heat-treated and said amidine having the general formula:

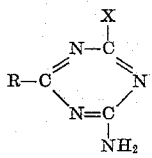

wherein R represents an alkyl radical having 7 to 17 carbon atoms in the chain, and X represents a member selected from the group consisting of hydroxyl and amino radicals.

13. A thermosetting composition comprising a heat-treated thermosetting molding aminoplast selected from the group consisting of urea-formaldehyde resin and melamine-formaldehyde resin and 0.2% to 2.0% of 2,4-amino-6-alkyl-1,3,5-triazine based on the weight of said resin, and wherein said alkyl radical has from 7 to 17 carbon atoms.

14. A thermosetting composition comprising a plasticized melamine-formaldehyde molding resin and 0.2% to 2.0% of an alkyl cyclic amidine based on the weight of said resin, said amidine having the general formula:

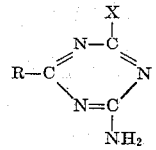

wherein R represents an alkyl radical having 7 to 17 carbon atoms in the chain, and X represents a member selected from the group consisting of hydroxyl and amino radicals.

15. A clear molded article comprising the heat and pressure molded composition of a plasticized aminoplast selected from the group consisting of urea-formaldehyde resin and melamine-formaldehyde resin, and 0.2% to 0.5% of 2-hydroxy-4-amino-6-alkyl-1,3,5-aminotriazine based on the weight of said resin, and wherein said alkyl radical has 7 to 17 carbon atoms.

16. A clear, molded article comprising the heat and pressure molded composition, a plasticized melamine-formaldehyde molding resin and 0.2%-0.5% of lauroyl guanide based on the weight of resin.

HENRY P. WOHNSIEDLER.
JOHN F. BLAIS.

REFERENCES CITED

The following references are of record in the file of this patent:

UNITED STATES PATENTS

| Number | Name | Date |
|---|---|---|
| 2,251,234 | Swain | July 29, 1941 |
| 2,321,052 | Thurston | June 8, 1943 |
| 2,328,424 | D'Alelio | Aug. 31, 1943 |
| 2,368,451 | D'Alelio | Jan. 30, 1945 |
| 2,385,765 | Thurston | Sept. 25, 1945 |
| 2,388,143 | Harris | Oct. 30, 1945 |
| 2,418,944 | Kaiser | Apr. 15, 1947 |
| 2,431,644 | Kaiser | Nov. 25, 1947 |

FOREIGN PATENTS

| Number | Country | Date |
|---|---|---|
| 567,063 | Great Britain | Jan. 26, 1945 |